(12) United States Patent
Yajima

(10) Patent No.: US 7,161,697 B2
(45) Date of Patent: Jan. 9, 2007

(54) METHOD AND APPARATUS FOR TRANSMITTING INFORMATION TO DIFFERENT DESTINATIONS

(75) Inventor: Shunsuke Yajima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 777 days.

(21) Appl. No.: 09/968,992

(22) Filed: Oct. 3, 2001

(65) Prior Publication Data
US 2003/0164989 A1    Sep. 4, 2003

(30) Foreign Application Priority Data
Oct. 6, 2000    (JP)    ............... P2000-308343

(51) Int. Cl.
G06F 15/00    (2006.01)
H04N 1/00    (2006.01)
H04N 1/32    (2006.01)

(52) U.S. Cl. ............... 358/1.15; 358/402; 358/407; 358/440; 358/442

(58) Field of Classification Search ............ 358/1.15, 358/402, 407, 497, 440, 442
See application file for complete search history.

(56) References Cited

U.S. PATENT DOCUMENTS 5,291,305 A * 3/1994 Sakashita et al. ............ 358/444

6,700,674 B1 * 3/2004 Otsuka et al. ............ 358/1.15

FOREIGN PATENT DOCUMENTS

| JP | 9-247334 | 9/1997 |
|---|---|---|
| JP | 11-168591 | 6/1999 |
| JP | 2000-59595 | 2/2000 |

* cited by examiner

*Primary Examiner*—Kimberly Williams
*Assistant Examiner*—Charlotte M. Baker
(74) *Attorney, Agent, or Firm*—Nixon & Vanderhye, PC

(57) ABSTRACT

An image transmitting apparatus according to the invention is configured such that destination-identifying information and a data format of the image data are registered, in one set, in a one-touch transmission key so that, by operating the one-touch transmission key, the image data can be transmitted to the intended destination in the predetermined data format. Moreover, in the image transmitting apparatus of the invention, it is possible to perform image transmission via a first transmission route, e.g., for electronic mail which accepts a plurality of file formats, and image transmission via a second transmission route such as an Internet FAX route which accepts a predetermined file format only, and, in registering destination-identifying information together with a corresponding file format in a one-touch transmission key, the predetermined file format is set when the second transmission route is set as a transmission route.

17 Claims, 10 Drawing Sheets

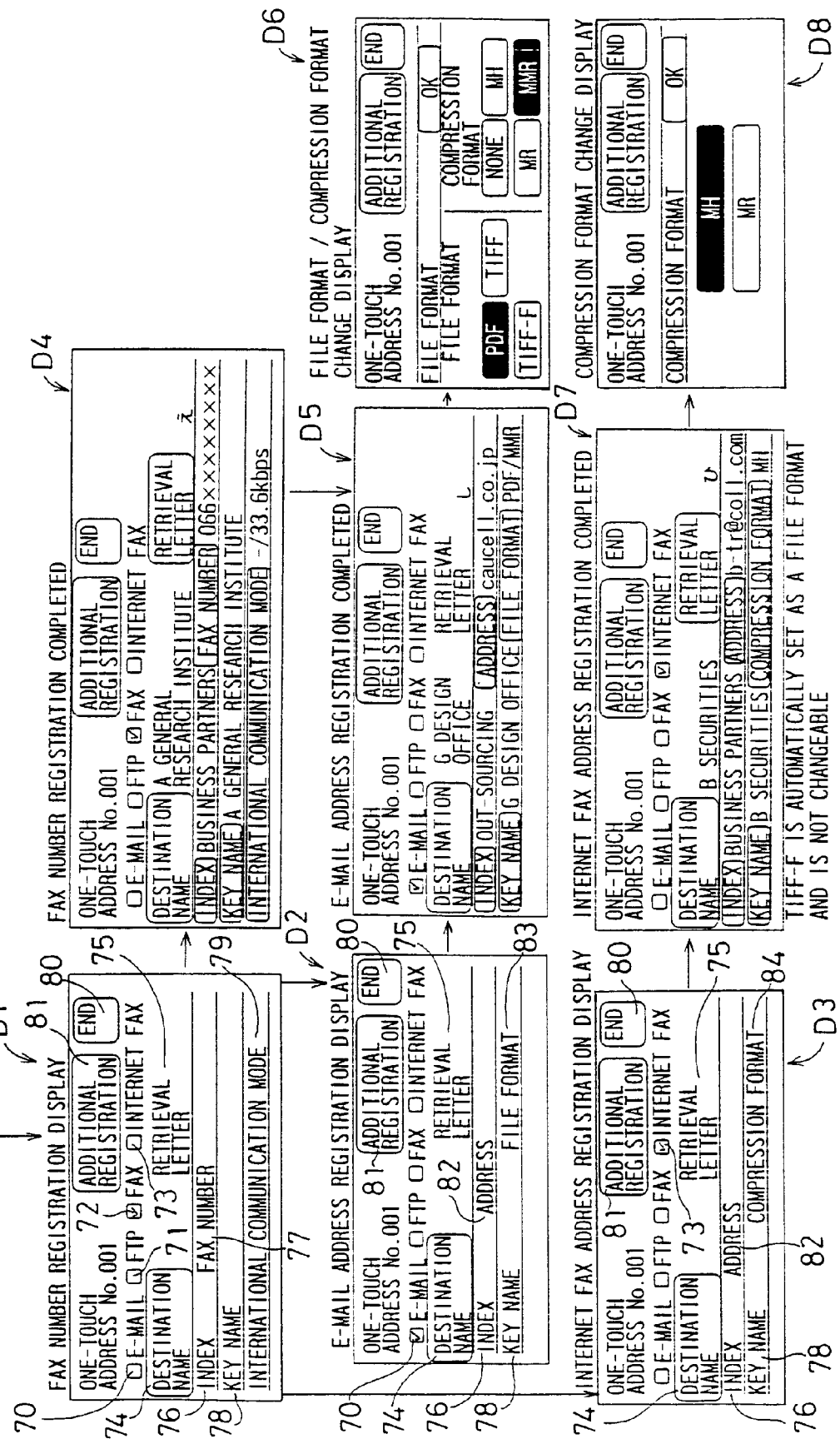

FIG. 6A

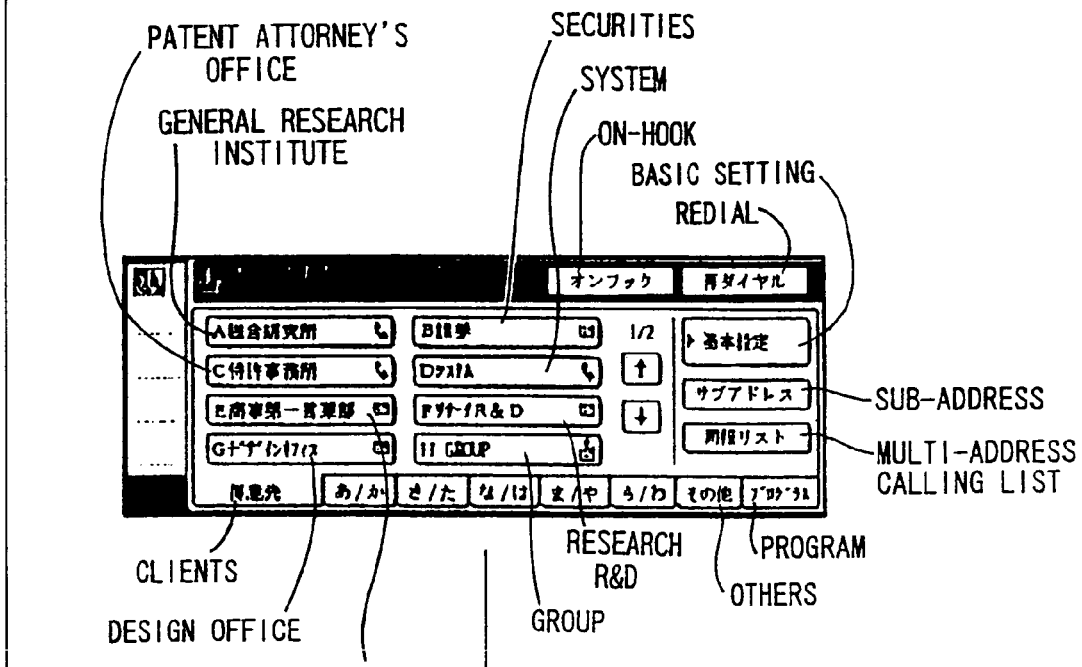

DESTINATION ADDRESS NOT INPUTTED

Labels: PATENT ATTORNEY'S OFFICE, GENERAL RESEARCH INSTITUTE, SECURITIES, SYSTEM, ON-HOOK, BASIC SETTING, REDIAL, SUB-ADDRESS, MULTI-ADDRESS CALLING LIST, CLIENTS, DESIGN OFFICE, COMMERCIAL COMPANY THE FIRST SALES DEPARTMENT, RESEARCH R&D, GROUP, PROGRAM, OTHERS

INPUT FIRST DESTINATION (E-MAIL ADDRESS)

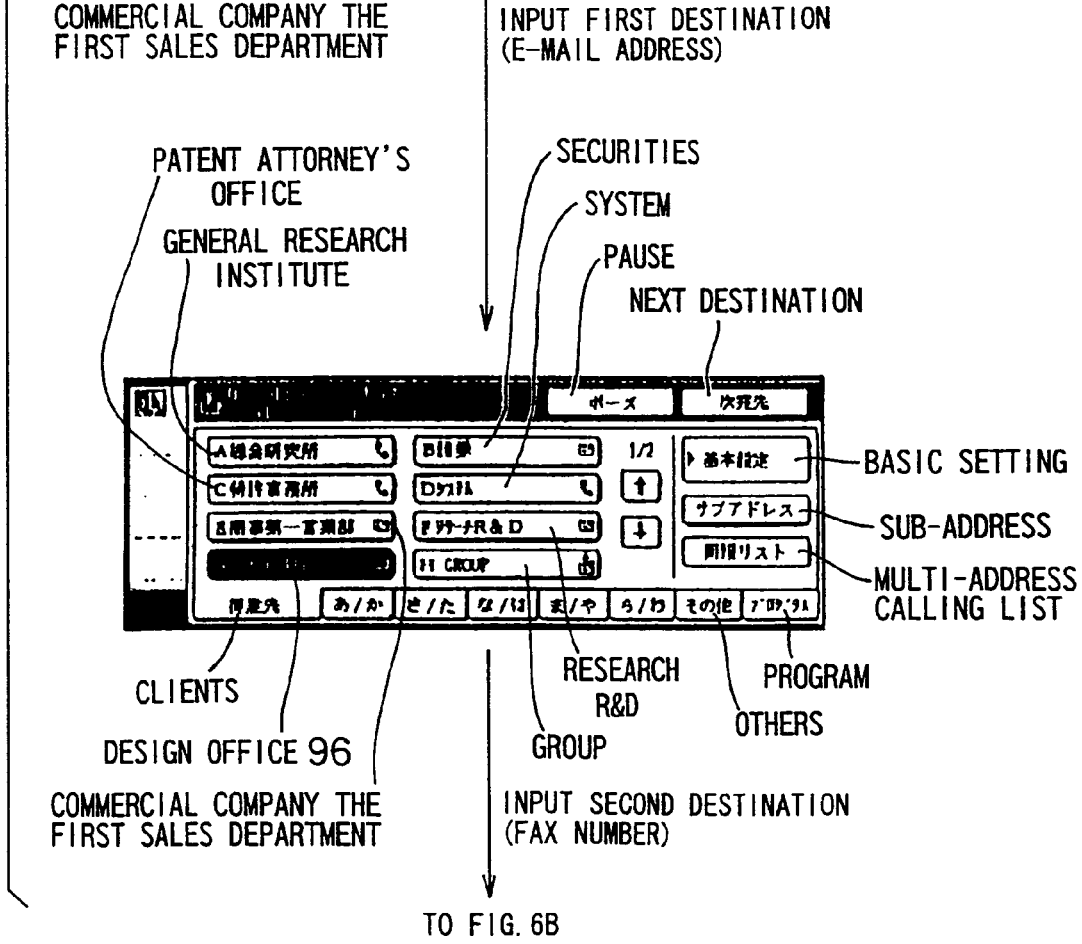

Labels: PATENT ATTORNEY'S OFFICE, GENERAL RESEARCH INSTITUTE, SECURITIES, SYSTEM, PAUSE, NEXT DESTINATION, BASIC SETTING, SUB-ADDRESS, MULTI-ADDRESS CALLING LIST, CLIENTS, DESIGN OFFICE 96, COMMERCIAL COMPANY THE FIRST SALES DEPARTMENT, RESEARCH R&D, GROUP, PROGRAM, OTHERS

INPUT SECOND DESTINATION (FAX NUMBER)

TO FIG. 6B

METHOD AND APPARATUS FOR TRANSMITTING INFORMATION TO DIFFERENT DESTINATIONS

BACKGROUND OF THE INVENTION

1. Field of the Invention

The present invention relates to an image transmitting apparatus applicable to a network for enabling image transmission to plural kinds of image receiving apparatus such as an Internet facsimile apparatus and a digital multifunction apparatus.

2. Description of the Related Art

Conventionally, there exists a facsimile apparatus which transmits images to a destination side image communication apparatus (facsimile apparatus) via a telephone line. However, accounting of charge to the calling party with respect to such image transmission depends on the distance from the calling party to the destination.

Recently, the Internet can be utilized, and network environment is being arranged which enables information communication with an image communication apparatus at a remote place by allocating to a destination side image communication apparatus an address for identifying the apparatus.

However, it will take more time until image communication apparatus for transmitting images via the Internet spread to all users of image communication apparatus. Thus, at present, there are both the users of conventional facsimile apparatus for transmitting images via a telephone line and the users of image communication apparatus for transmitting images via the Internet (such as an Internet fax, a digital multifunction apparatus, a printer or a personal computer).

Under such conditions where a plurality of image transmitting routes exist, designating an image transmitting route and a destination or the like in every image transmitting operation may deteriorate the operation efficiency. Although a mere telephone number (facsimile number) can be inputted by the use of a numeric keypad, when images are to be transmitted via the Internet, address information of a destination need be inputted by the use of alphanumeric keys. For this purpose, a keyboard like that of a personal computer need be provided on an operation panel, which increases the size of the operation panel as well as the number of operation keys, thereby making the operation panel complicated. On the other hand, it makes input operation complicated to allocate a plurality of functions to each of the keys to reduce the number of keys.

To solve such problems, the gazette of Japanese Unexamined Patent Publication JP-A 9-247334 (1997) discloses a technique in which destination-identifying information (a facsimile number or address) is in advance registered in a one-touch dial key so that the destination can be designated only by operating the key.

In the technique disclosed in this publication, destination information such as its telephone number or address is in advance registered in a one-touch dial key. Owing to the key, the destination can be easily designated without the need for inputting the destination-identifying information by operating alphanumeric keys in each time of image transmitting operation.

Recently, however, by attaching image data to electronic mail, it is possible to transmit images, via e.g., the Internet, to various kinds of apparatus such as an Internet facsimile apparatus, a digital multifunction apparatus, a printer, a personal computer, or a mobile phone. Moreover, such apparatus may be different from each other in data format that can be processed by the apparatus.

Therefore, Japanese Unexamined Patent Publication JP-A 2000-59595 (2000) discloses a technique of setting an image data format for a destination. In this technique, the image data format with respect to each of destinations is in advance registered. Therefore, it is possible to transmit images in a data format which can be processed by the destination apparatus.

Specifically, as shown in the description of FIG. 4 of the gazette, a look-up table including destination-identifying information and corresponding image data formats are stored in a ROM. Thus, when a destination stored in the look-up table shown in FIG. 4 is designated, the image data is transmitted in the registered image data format.

With such a method, however, only destination addresses are recorded in the address directory for designating a destination. Therefore, it is necessary to execute a step (S33 in FIG. 3 of the publication) of determining whether or not the designated destination address is recorded in the look-up table, which requires a certain period of processing time before starting of the data transmission. Such a step is necessary every time of data transmission, so that the time taken for the process step becomes a serious problem as the number of registrations increases.

Moreover, besides the input operation for designating a destination, it is necessary to input destination-identifying information (destination address) by the use of alphanumeric keys for the look-up table as shown in FIG. 4. This takes much time before the completion of registration and is troublesome.

SUMMARY OF THE INVENTION

The invention is conceived in view of the above-described problems. An object of the invention is to enhance operation efficiency in registering destinations and in transmitting images in an image transmitting apparatus capable of selecting a suitable transmission route.

The invention provides an image transmitting apparatus capable of performing image transmission via a first transmission route, including electronic mail which accepts a plurality of file formats and image transmission via a second transmission route, including Internet fax which accepts only one predetermined file format, the image transmitting apparatus comprising:

a one-touch transmission key for registering file formats therein, wherein in registering a file format in the one-touch transmission key in correspondence to destination-identifying information, the predetermined file format is registered in the case where the second transmission route is set as a transmission route.

According to the invention, an image file format suitable for the selected image transmission route is set, so to speak, automatically. Therefore, it is possible to enhance operation efficiency in registration of destinations in a one-touch transmission key.

Further, the invention provides an image transmitting apparatus capable of performing image transmission via a first transmission route, including electronic mail which accepts a plurality of file formats or Internet fax and image transmission via a second transmission route, including telephone line fax for which a transmission format is determined by a communication protocol, the image transmitting apparatus comprising:

a one-touch transmission key for registering destinations therein, wherein, in registering a destination in the one-touch transmission key, registration of destination-identifying information together with a data format of an image to be transmitted is possible in the case where the first transmission route is set, whereas registration of destination identifying information is possible in the case where the second transmission route is set.

For some routes of image transmission, the usable image data format may be limited. According to the image transmitting apparatus of the invention, the data format suitable for a selected image transmission route is automatically set. Therefore, it is possible to enhance operation efficiency in registering a destination in a one-touch transmission key. Moreover, there is a transmission route, like FAX transmission, for which a transmission format is determined by communication protocol. Also in the case where such a transmission route is selected, the operation efficiency in registering a destination in a one-touch transmission key is enhanced.

In the invention it is preferable that the image data format which is set as a result of selecting a transmission route can be optionally changed to another data format.

According to the invention, the data format suitable for the selected transmission route is automatically (on a priority basis) set. However, depending on conditions of a destination, there may be some cases where the user wishes to transmit images in a data format different from the set data format. Therefore, in making registration in a one-touch transmission key, the data format can be optionally set (changed) depending on the conditions of a destination. With such a structure, it is possible to meet various needs of users.

Further, the invention provides an image transmitting apparatus comprising a one-touch transmission key for registering destination-identifying information and a data format of image data to be transmitted in one set therein, the image data being transmitted to a designated destination in the predetermined data format by operating the one-touch transmission key.

According to the invention, by operating a single key (one-touch transmission key), image data can be transmitted to a desired destination in a predetermined data format. Since an image can be transmitted to a desired destination always in such a data format that can be processed at the destination side, confusion occurs neither at the transmitting side nor at the destination side. Moreover, with such an arrangement, the control section, which manages (controls) transmission operation, can smoothly perform its processing in connection with the program structure. Further, in connection with the hardware structure, simplified and smooth management can be achieved.

In the invention it is preferable that the one-touch transmission key is provided for each of a plurality of destinations, and when a plurality of one-touch transmission keys are operated with respect to image data to be transmitted, image data in each of data formats registered in the operated one-touch transmission keys is produced and the produced image data in the respective data formats is successively transmitted to the respective corresponding destinations.

According to the invention, the transmission routes and data formats registered in the respective one-touch transmission keys are checked (for arranging and classifying the destinations according to kind of data format), and the order of data transmission to the destinations is determined based on the transmission route and the data format. Therefore, it is possible to successively transmit images to a plurality of destinations in an efficient manner.

BRIEF DESCRIPTION OF THE DRAWINGS

Other and further objects, features, and advantages of the invention will be more explicit from the following detailed description taken with reference to the drawings wherein:

FIG. 4 illustrates the process steps for registering destination-identifying information and a data format of an image to be transmitted;

DETAILED DESCRIPTION OF THE PREFERRED EMBODIMENTS

Figure 1:
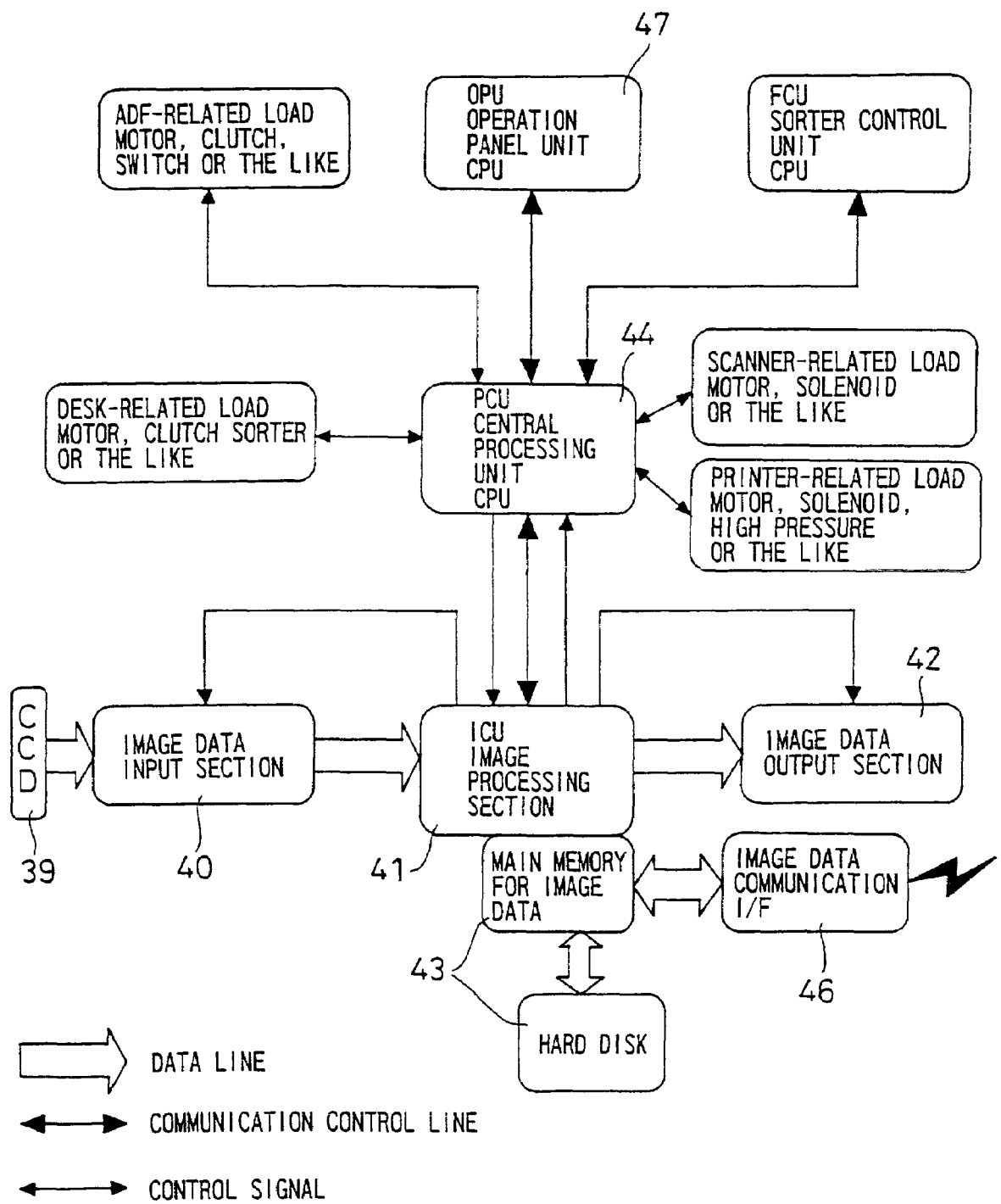
FIG. 1 is a block diagram showing a functional structure of a facsimile apparatus 1 embodying the invention.

Now referring to the drawings, preferred embodiments of the invention are described below.

FIG. 1 is a block diagram showing a functional structure of a facsimile apparatus 1 embodying the invention. The facsimile apparatus illustrated in FIG. 1 reads a document image by a CCD image sensor 39 provided in a scanner and transmits image data of the read image to an image processing section 41 via an image data input section 40. The read image data is processed at the image processing section 41 and is transmitted to an image data output section 42 or a main memory and a hard disk 43 in accordance with the objective.

Specifically, in the case where the facsimile apparatus is utilized as a copying machine, the image data is transmitted to the image data output section 42 for making a copy of the document image by a non-illustrated image forming section. On the other hand, in the case where the facsimile apparatus is utilized for transmitting the image, the image data is transmitted to the main memory and the hard disk 43, and then transmitted to a destination via a transmission route, which will be described later, connected to an image data communication interface 46.

The facsimile apparatus is controlled by a central processing unit (CPU) 44. In addition to the above-described sections, the CPU 44 controls an automatic document feeder (ADF), a desk, a sorter, the scanner and a printer and the like. Further, the CPU controls an operation panel unit 47. The operation panel unit 47 is connected to a display panel and an operation panel provided with various operation keys which will be described later, so that instructions from the user or notification to the user is conveyed through the operation panel unit 47.

Figure 2:
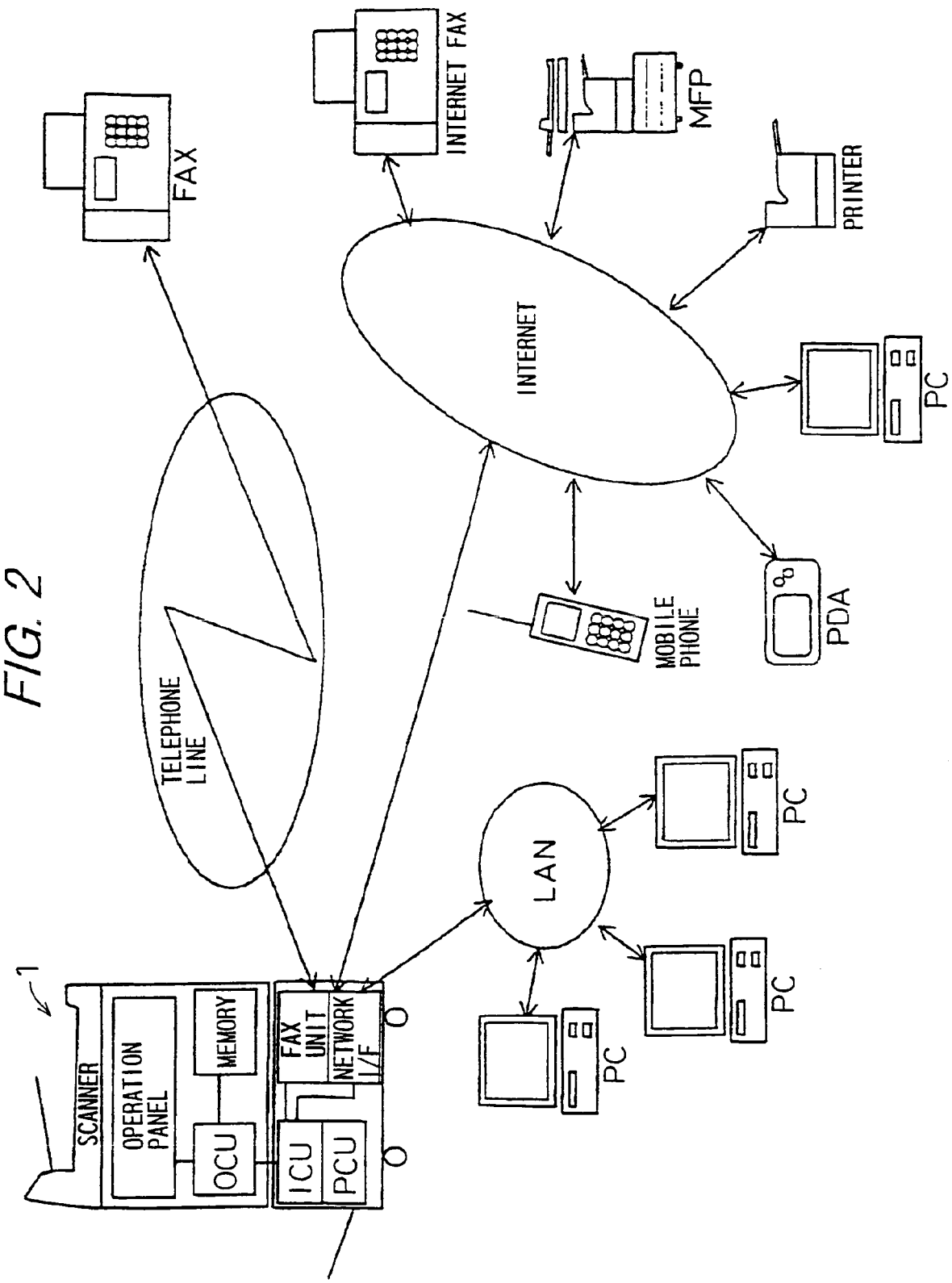
FIG. 2 is a schematic view illustrating an example of network for connection to the facsimile apparatus 1 embodying the invention.

FIG. 2 is a schematic view illustrating an example of network for connection to the facsimile apparatus 1 embodying the invention. The facsimile apparatus 1 is connected to transmission routes such as a telephone line, a LAN or the Internet. Thus, from the apparatus 1, image data may be transmitted for example to an ordinary facsimile apparatus (FAX) via the telephone line, to an Internet facsimile apparatus (Internet FAX), a multifunction printer (MFP), a printer, a personal computer (PC), a PDA, or a mobile phone via the Internet, and to a personal computer (PC) via the LAN. It is to be noted that the image data transmission to a PC may be performed by E-mail or FTP (File Transfer Protocol).

The image data transmission from the facsimile apparatus 1 is generally divided into two types. That is, in the case of data transmission to a facsimile apparatus, a destination is specified by a facsimile number, whereas in the case of data transmission to an apparatus connected to the Internet or LAN, a destination is specified by an address. Further, the apparatus connected to the Internet or LAN includes an apparatus, such as an Internet fax, for which a standard data file format is fixed, and an apparatus, such as a PC, for which various file formats are used.

Therefore, in transmitting image data, it is preferable to specify the destination-identifying information (i.e., a facsimile number and an address) as well as the data format (i.e., a file format and a compression format) of the image data to be transmitted. However, inputting such information every time of image data transmission may put a burden on the user.

Therefore, in the facsimile apparatus 1, these information for respective destinations are stored as a table in a memory directly connected to the CPU 44 and the information about each of the destinations is associated with a one-touch transmission key provided on the operation panel. With such a structure, once the user registers a destination, it is possible, from the next time transmission, to easily designate the information on the destination just by pressing the relevant one-touch transmission key.

Figure 3A:
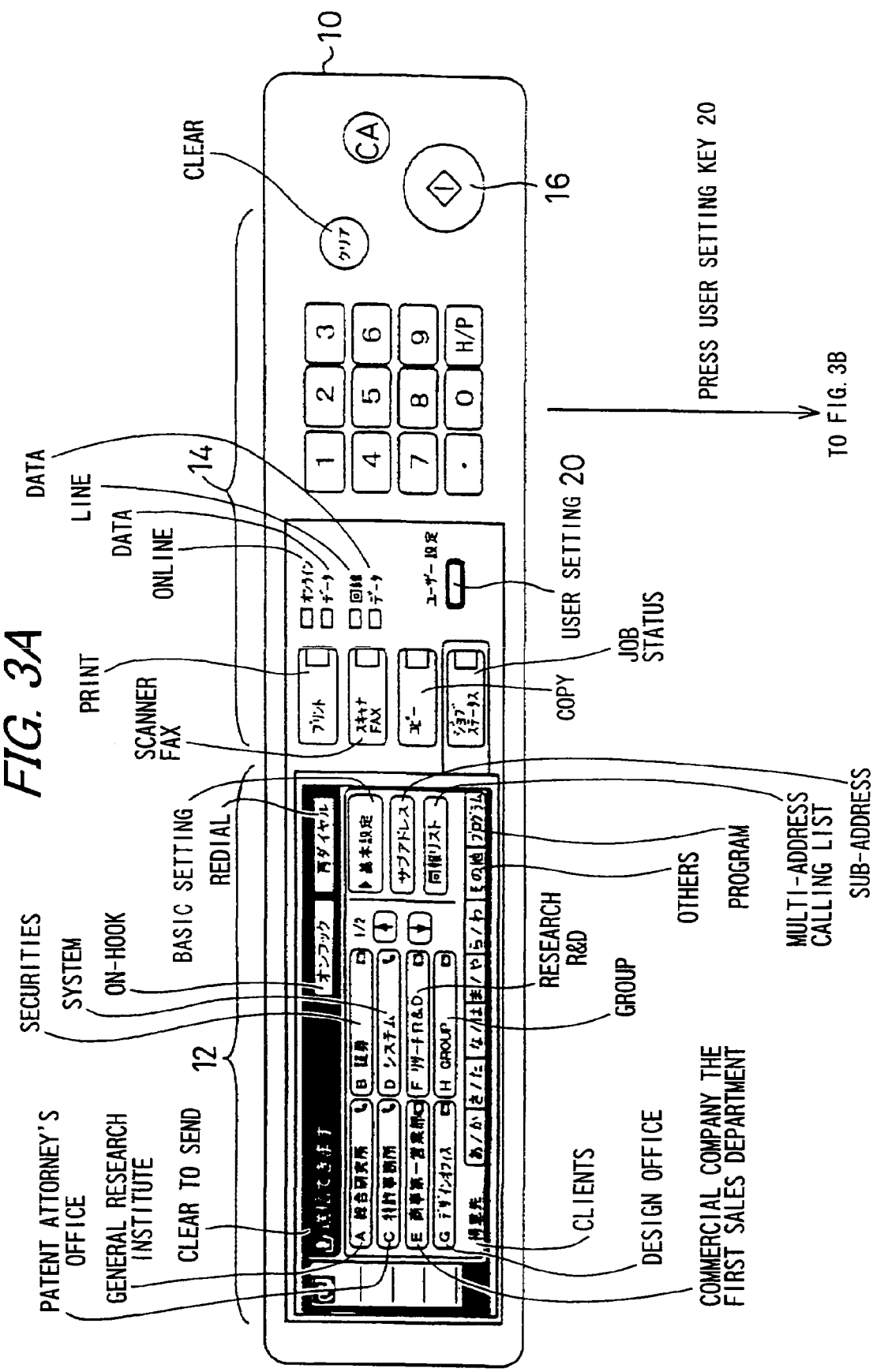
FIG. 3 illustrates the process steps for registering destination-identifying information and a data format of an image to be transmitted.
Figure 3B:
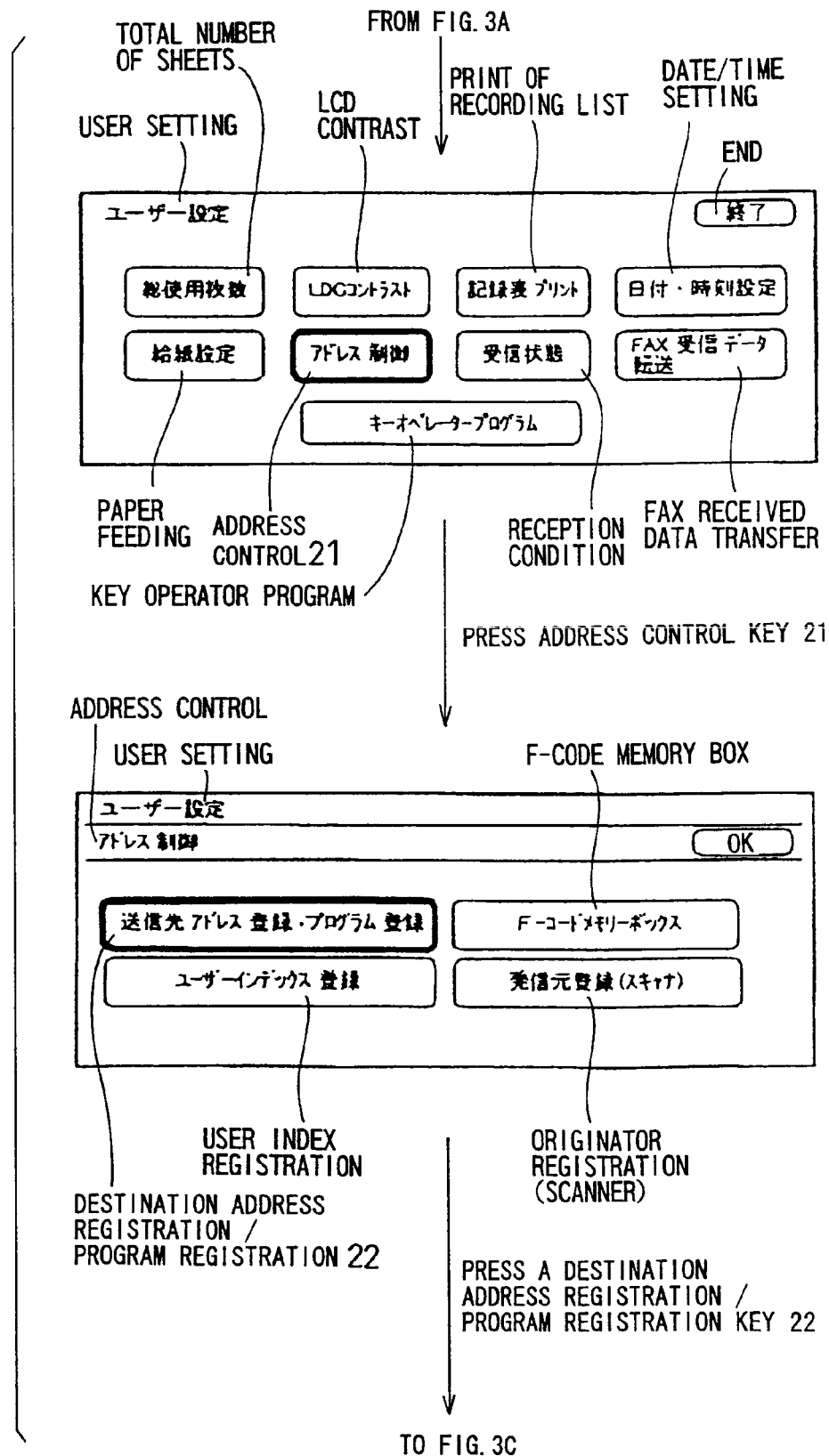
Figure 3C:
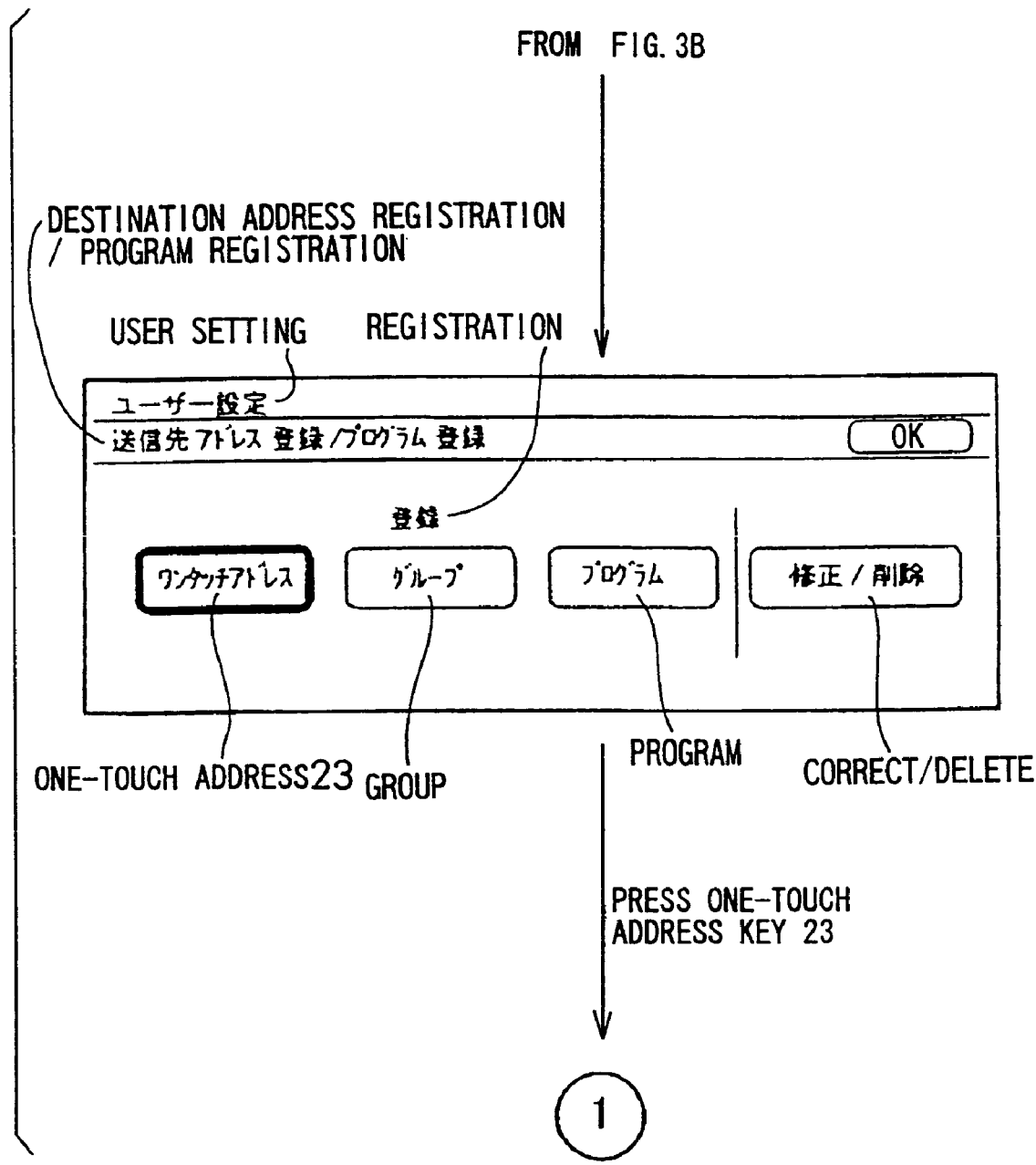

FIGS. 3 and 4 illustrate the process steps for registering destination-identifying information and a data format of an image to be transmitted. Referring to FIGS. 3 and 4, the method of registering the above-described information using the facsimile apparatus according to the invention will be described. The facsimile apparatus is provided with an operation panel 10 which comprises a display panel 12 and an operation key section 14. The display panel 12 may be in the form of a touch display.

For registering the above-described information, the user presses a user setting key 20 provided at the operation key section. As a result, the display panel 12 shows a user-setting display. Then, by successively pressing an address control key 21, a destination address registration/program registration key 22, and one-touch address key 23 displayed on the display panels 12, a FAX number registration display D1 shown in FIG. 4 appears.

Although the FAX number registration display D1 is set as a default of a registration display, another registration display may be set as a default. Examples of such registration display other than the FAX number registration display D1 include an E-mail address registration display D2, an FTP registration display (not shown) and an Internet FAX address registration display D3. By pressing an E-mail key 70, an FTP key 71, a FAX key 72 or an Internet FAX key 73 provided at an upper portion of respective registration displays, the display changes to the intended registration display.

Information items to be inputted in each of the registration displays appear in the form of keys at a lower portion of the display. By pressing each of the keys, a display corresponding to the pressed key appears for enabling registration of the information.

First, information to be registered in the FAX number registration display D1 will be described. With respect to this registration display, a destination name 74, a retrieval letter 75, index 76, FAX number 77, key name 78 and international communication mode 79 are registered. In this case, the destination-identifying information corresponds to the FAX number. With respect to FAX transmission, the data format is set to a predetermined one, so that registration of a data format by the user is not performed.

Among the letters representing the name of a destination, a predetermined number of letters from the head (in a range which can be displayed as the name of a one-touch transmission key) are normally set as a default for the key name 78. For the international communication mode 79, a mode which is commonly used is set as a default. Information set as a default may be changed by the user as required.

When registration of the above-described information is completed, an end key 80 may be pressed for finishing the registration operation, or an additional registration key 81 may be pressed for successively registering information about another destination. The display D4 is a display which appears after completion of the FAX number registration.

With respect to the E-mail address registration display D2, a destination name 74, a retrieval letter 75, an index 76, an address 82, a key name 78 and a file format 83 are registered. In this case, the destination-identifying information corresponds to the address 82. Further, the data format corresponds to the file format 83. For the file format 83, a selected one of PDF, TIFF, and TIFF-F is registered as the file format and a selected one of Proof-2000/10/10, NONE (non-compression), MH, MR and MMR is registered as the compression format, as shown in the display D6. A file format which can be utilized or preferred by a destination side be registered as the file format 83. The display D5 is a display which appears after completion of the E-mail address registration.

With respect to the Internet FAX address registration display D3, a destination name 74, a retrieval letter 75, an index 76, an address 82, a key name 78 and a compression format 84 are registered. In this case, the destination-identifying information corresponds to the address 82. Further, the data format corresponds to the compression format 84. For an Internet FAX, the file format is not selectable by the user, because TIFF-F is used as the standard file format in the field. Therefore, the key 83 provided in the E-mail address registration display D2 for registering a file format is not provided, and TIFF-F is registered, so to speak, automatically. On the other hand, the key 84 for compression format is provided so that compression format of MH or MR can be selected in a display D8 by the user. The display D7 is a display which appears after completion of Internet FAX address registration.

The FTP registration display is basically the same as the E-mail registration display except that the details of the address 82 are different. Therefore, the illustration of the FTP registration display is omitted.

As described above, in the facsimile apparatus of the invention, information necessary for image transmission to each of destinations is registered in a relevant key (one-touch transmission key). At that time, when a transmission route for each destination is selected by the user, information items are narrowed down to ones necessary for the transmission via the selected route. In other words, in accordance with a selected transmission route or the like, the user is prompted to register information which need be registered for image transmission through the route. Therefore, the efficiency in registering operation by the user can be enhanced.

Figure 5:
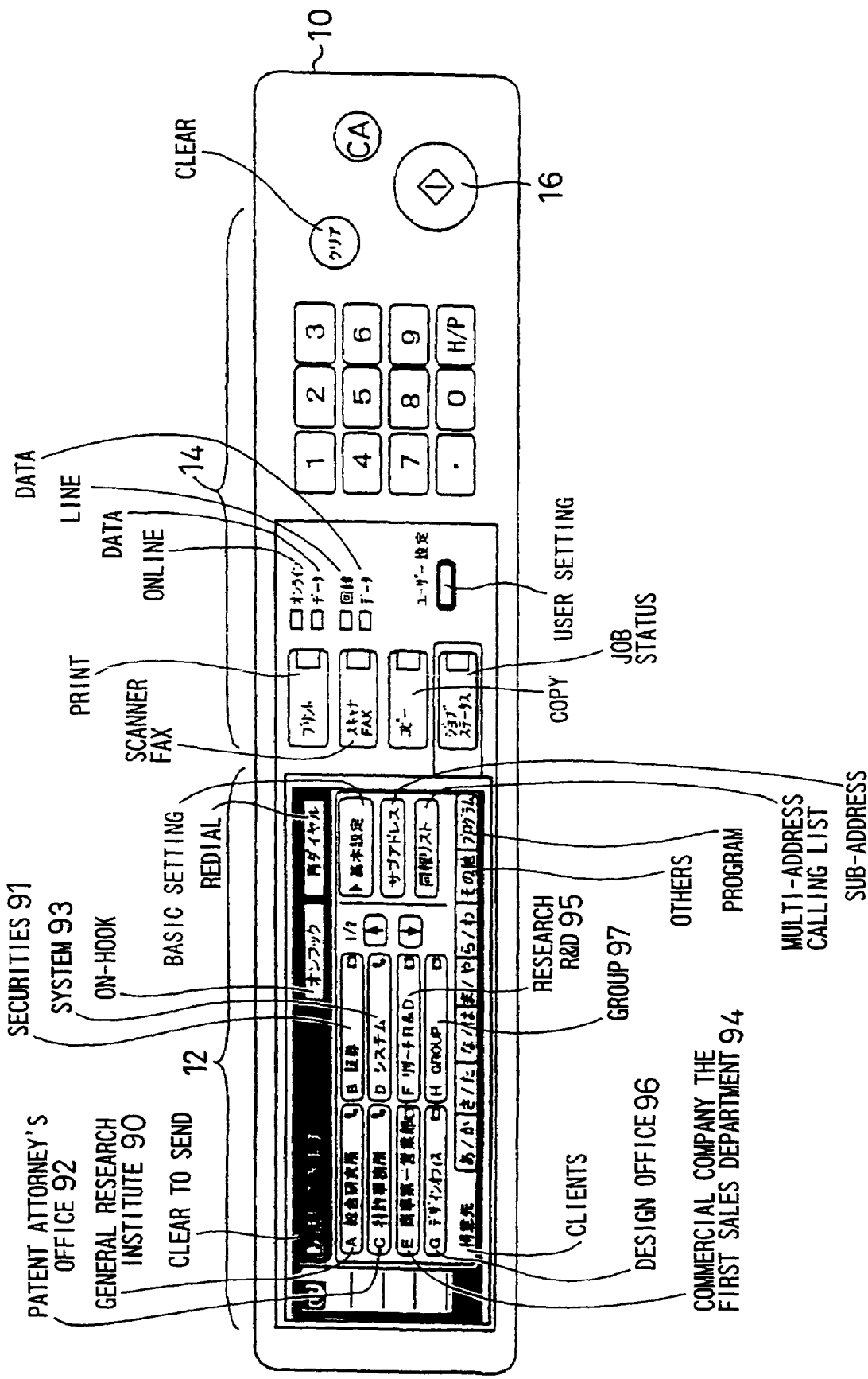
FIG. 5 illustrates an operation panel of the facsimile apparatus in conditions prepared for image transmission.
Figure 6B:
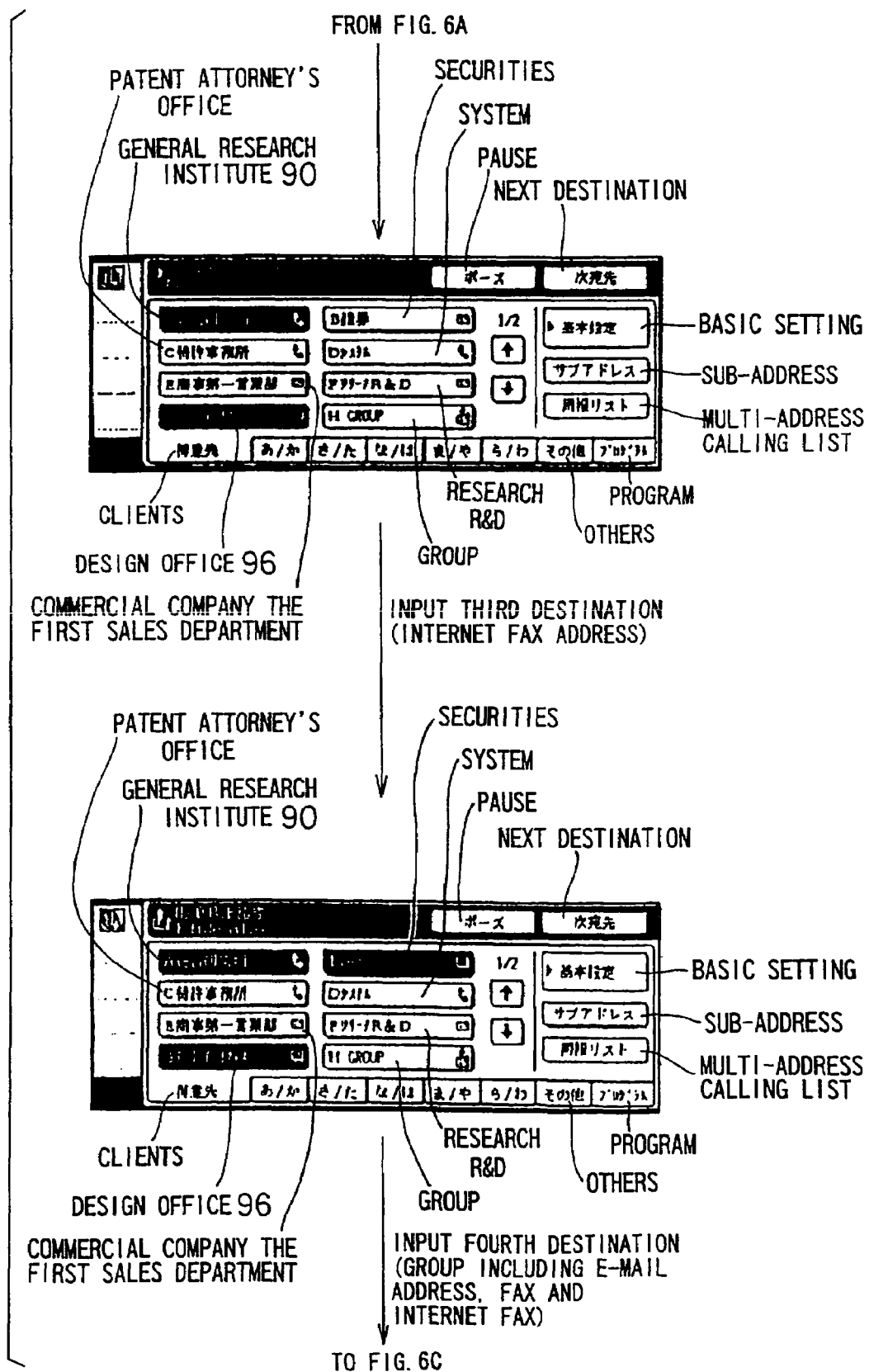
FIG. 6 illustrates the process steps for multicasting i.e., for transmitting the same image data to a plurality of destinations.
Figure 6C:
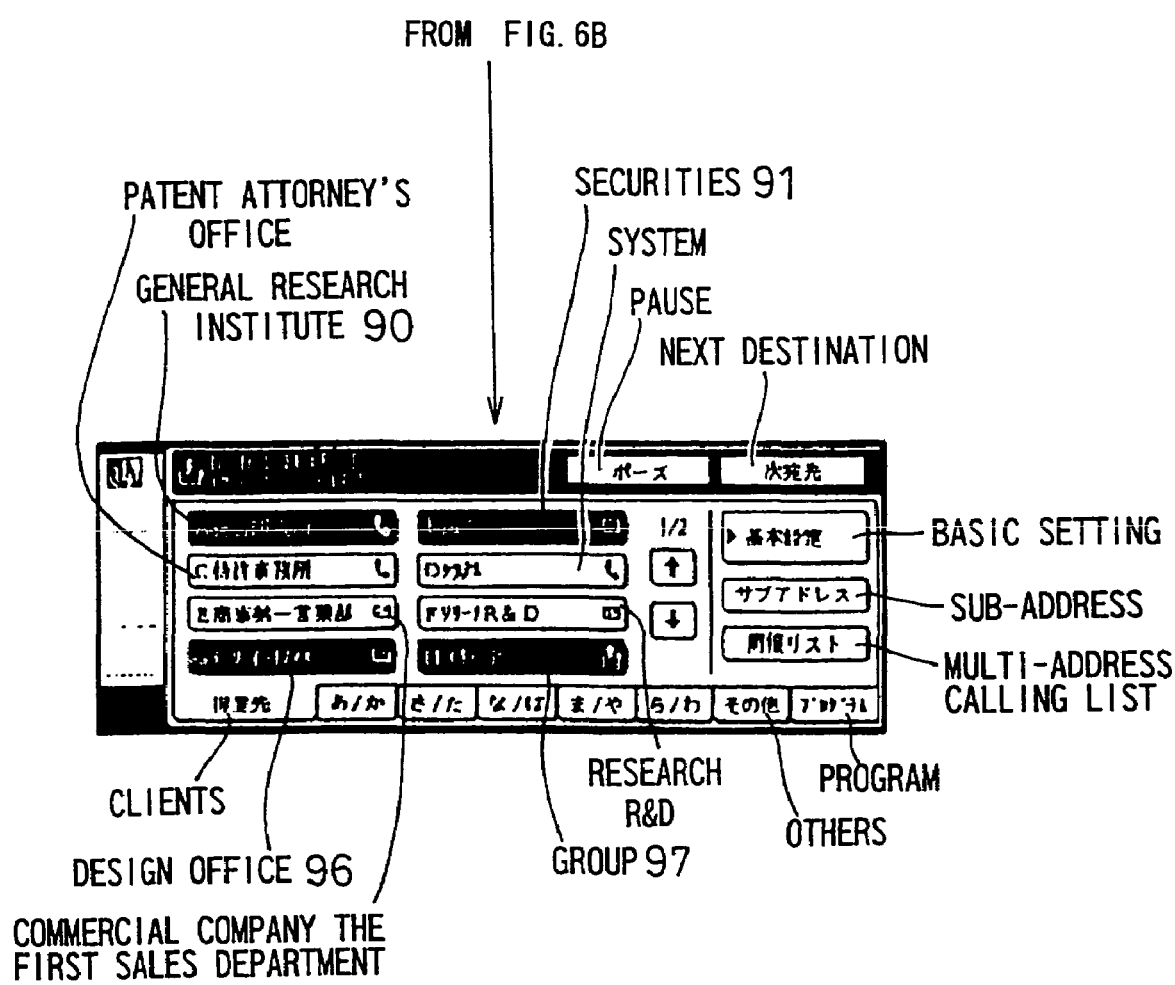

Referring now to FIGS. 5 and 6, the process for performing image transmission utilizing the one-touch transmission key registered in the above-described manner will be described. FIG. 5 illustrates the operation panel 10 in conditions prepared for image transmission. At this time, a plurality of one-touch transmission keys 90–97 for the registered destinations are displayed on the display panel 12 as grouped. It should be noted that the grouping is performed based on the retrieval letter 75 and the index 76 of the registered information. Further, the representation of each of the one-touch transmission keys is determined based on the key name 78 of the registered information.

Further, illustrations of a telephone receiver, a letter and a combination of the both applied in the one-touch transmission keys 90–97 indicate that the corresponding destinations are a FAX, an Internet FAX or E-mail, or both, respectively.

For transmitting image data read by the scanner, the data transmission can be started by pressing one of the one-touch transmission keys 90–97 which corresponds to an intended destination and then pressing a start key 16. Further, for transmitting same image data to a plurality of destinations, i.e., for multicasting, the one-touch transmission keys 96, 90, 91 and 97 for example may be successively pressed for designating a plurality of destinations before the start key 16 is pressed, as shown in FIG. 6.

Further, in transmitting image data to a plurality of destinations, the addresses may be classified into groups according to the registered data format. Thereafter, for the addresses for which a same transmission route is used, transmission operation is performed successively, whereas for the addresses for which different transmission routes are used, transmission operation is performed simultaneously. In this way, the transmission operation can be carried out efficiently.

As described above, according to the facsimile apparatus of the invention, in registering information on a destination in a one touch transmission key, the transmission route is first determined, and other transmission conditions are registered as to whether the destination-identifying information is a telephone number or an address and how the data format of the image to be transmitted is or the like. This leads to an enhancement of the operation efficiency in registering a destination and in performing image transmission.

The invention may be embodied in other specific forms without departing from the spirit or essential characteristics thereof. The embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image transmitting apparatus capable of performing image transmission via a first transmission route, including electronic mail which accepts a plurality of file formats, and image transmission via a second transmission route, including Internet fax which accepts only one predetermined file format, the image transmitting apparatus comprising:
   a one-touch transmission key for registering file formats therein,
   wherein in registering a file format in the one-touch transmission key in correspondence to destination-identifying information, one of the plurality of file formats is user-designated in the case where the first transmission route is set as a transmission route and the predetermined file format is automatically-designated in the case where the second transmission route is set as a transmission route.

2. An image transmitting apparatus capable of performing image transmission via a first transmission route, including electronic mail which accepts a plurality of data formats or Internet fax, and image transmission via a second transmission route, including telephone line fax for which a transmission format is determined by a communication protocol, the image transmitting apparatus comprising:
   a one-touch transmission key for registering destinations therein,
   wherein, in registering a destination in the one-touch transmission key,
   registration of destination-identifying information together with a user-designated one of the plurality of data formats of an image to be transmitted is possible in the case where the first transmission route is set,
   whereas registration of destination identifying information together with an automatic designation of the transmission format determined by the communication protocol is possible in the case where the second transmission route is set.

3. The image transmitting apparatus of claim 1,
   wherein the image file format which is set as a result of selecting a transmission route can be optionally changed to another file format.

4. The image transmitting apparatus of claim 2,
   wherein the image data format which is set as a result of selecting a transmission route can be optionally changed to another data format.

5. An image transmitting apparatus comprising:
   one-touch transmission keys for respectively registering destination-identifying information and a data format of image data to be transmitted in one set therein, wherein a first one-touch transmission key registers destination identifying information together with an automatically-designated data format of an image to be transmitted and a second one-touch transmission key registers destination identifying information together with a user-designated data format of an image to be transmitted,
   the image data being transmitted in a data format determined by which one-touch transmission key is operated.

6. The image transmitting apparatus of claim 5, wherein when a plurality of one-touch transmission keys are operated with respect to image data to be transmitted, image data in each of data formats registered in the operated one-touch transmission keys is produced and the produced image data in the respective data formats is successively transmitted to the respective corresponding destinations.

7. An image transmitting system, comprising:
   one or more communication sections for transmitting images using at least first and second different transmission methods;
   an operating section including one or more one-touch transmission keys each having a respective destination for image transmitting associated therewith;
   a memory section storing, for each one-touch transmission key, destination identifying information for the associated destination and a data format for image transmitting to the associated destination; and
   a control section that operates to store in the memory section, for a particular one-touch transmission key, an automatically specified data format for image transmitting if the destination identifying information input via the operating section for the particular one-touch transmission key identifies a destination for which the first transmission method is used and that operates to store in the memory section, for the particular one-touch transmission key, a user-specified data format for image transmitting if the destination identifying information input via the operating section for the particular one-touch transmission key identifies a destination for which the second transmission method is used.

8. The image transmitting system of claim 7, wherein the one-touch transmission keys are displayed on a touch-sensitive display portion of the operating section.

9. The image transmitting system of claim 7, wherein the memory section stores, for one or more of the one-touch transmission keys, a compression format for image transmitting to the associated destination.

10. The image transmitting system of claim 7, wherein the one-touch transmission keys are grouped in the operating section according to specified criteria.

11. The image transmitting system of claim 7, wherein the first transmission method is Internet facsimile.

12. The image transmitting system of claim 7, wherein the control section further operates, when one of the one-touch transmission keys is actuated, to transmit an image to the destination identified by the destination identifying information stored in the memory section for the actuated one-touch transmission key, using the data format stored in the memory section for the actuated one-touch transmission key.

13. The image transmitting system of claim 7, wherein the control system further operates, when a plurality of one-touch transmission keys are actuated, to transmit the same image to the destinations identified by the destination identifying information stored in the memory section for the respectively actuated one-touch transmission keys using the data formats stored in the memory section for the respectively actuated one-touch transmission keys.

14. The image transmitting system of claim 13, wherein the same image is transmitted simultaneously to first and second different destinations respectively using the first and second transmission methods.

15. The image transmitting system of claim 13, wherein the same image is transmitted successively to first and second different destinations.

16. A facsimile machine comprising the image transmitting system of claim 7.

17. A digital multifunction apparatus comprising the image transmitting system of claim 7.

* * * * *